May 4, 1926.
W. J. GROTENHUIS
AUTOMOBILE BUMPER
Filed Nov. 21, 1925
1,582,979
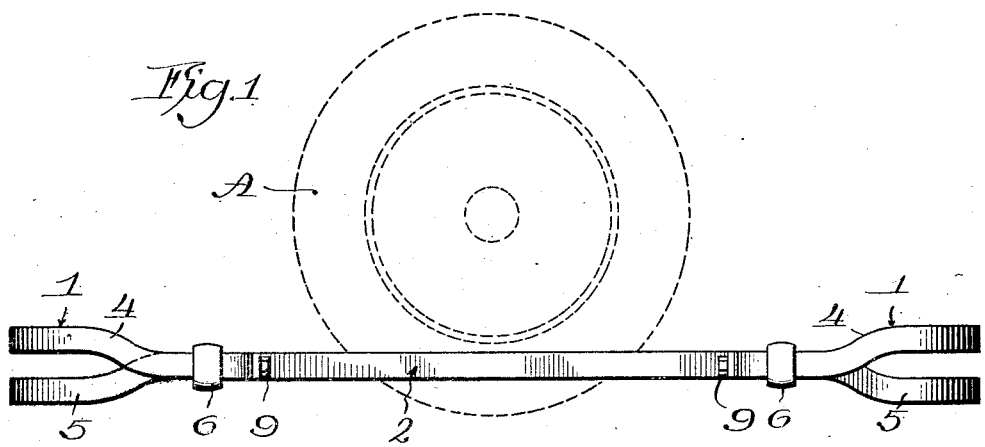
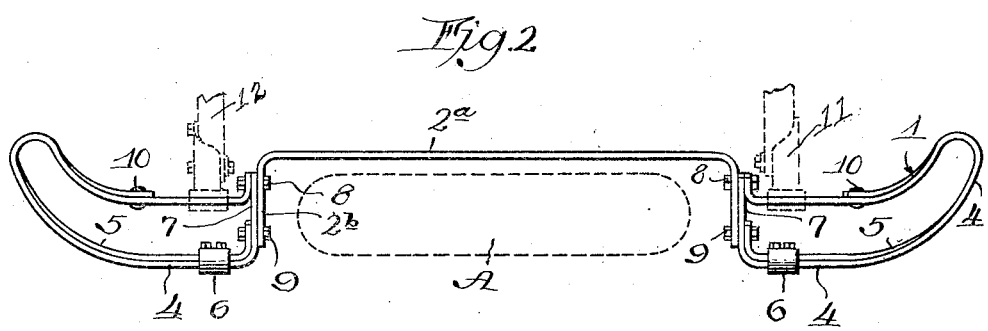
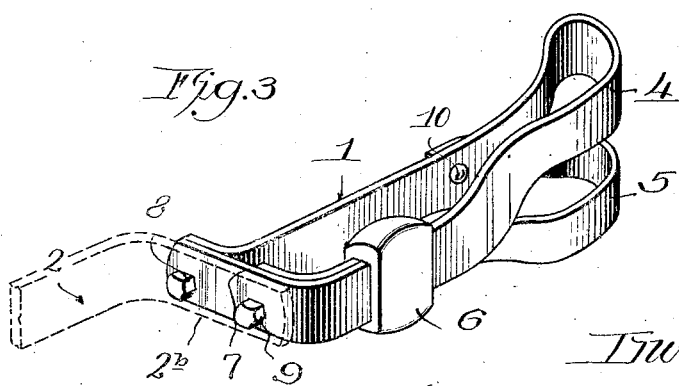
Witness:
Chas. R. Hoursh.
Inventor,
William J. Grotenhuis, Patented May 4, 1926.

1,582,979

UNITED STATES PATENT OFFICE.

WILLIAM J. GROTENHUIS, OF CHICAGO, ILLINOIS, ASSIGNOR TO BIFLEX PRODUCTS CORPORATION, OF WAUKEGAN, ILLINOIS, A CORPORATION OF DELAWARE.

AUTOMOBILE BUMPER.

Application filed November 21, 1925. Serial No. 70,467.

*To all whom it may concern:*

Be it known that I, WILLIAM J. GROTENHUIS, a citizen of the United States of America, and a resident of Chicago, in the county of Cook and State of Illinois, have invented a certain new and useful Improvement in Automobile Bumpers, of which the following is a specification.

This invention relates to improvements in automobile bumpers, and more particularly to bumpers for protecting the rear of a vehicle, consisting of a pair of bumper units extending laterally from the end thereof and disposed rearwardly in line with fenders, said units being connected together by a bar offset inwardly from the plane of the bumper units, and toward the body of the car thus providing an intervening space for the spart tire or wheel.

The object of the invention is to provide a bumper which may be readily lengthened or shortened to compensate for differences in width between frame members in different makes of vehicles, and at the same time locate the bumper units in proper position with respect to the fenders.

A preferred embodiment of the invention is disclosed in the accompanying drawing, in which—

Figure 1 is a view in front elevation of the bumper as mounted on the rear of a vehicle;

Figure 2 is a top plan view of the bumper; and

Figure 3 is a perspective view of one of the bumper units and a portion of the connecting bar.

As clearly shown in Figures 1 and 2, the complete bumper consists of two end sections or units 1, 1 and an intermediate bar or connecting member 2, the latter consisting of a bar of steel having a straight central section 2ª and end portions 2ᵇ, 2ᵇ bent at right angles and extending outwardly from the rear of the car. The bumper units 1, 1 are detachably connected to these end portions by means of bolts, as will be presently described, and extend outwardly in substantially the same plane as the spare wheel or tire A.

As thus disclosed, each bumper unit is made up of two lengths of bar stock 4 and 5, one bent into a complete loop and the other forming an auxiliary bar extending throughout the end portion of the unit. These bars are offset vertically one above the other to form a widened impact area, their ends being brought into flatwise contact and preferably clamped together in front and riveted together at the rear. Thus, intermediate the forward portion of the unit, as shown in Figure 3, a clamp 6 secures the overlapping portions of the bars together, the bar 4 being outside, and bent rearwardly a short distance beyond the clamp to form a transverse end section 7, uniting with the other extremity of the same bar, by a bolt 8 passing through the two ends of the bar, which come into flatwise contact by bending the opposite end into the same plane. The inner end of the auxiliary bar follows the outer or main bar 4, beyond the right-angled bend of the transverse section 7, terminating midway of the same, and secured by another bolt 9. The opposite end of the auxiliary bar 5 is riveted at 10 to the main bar 4, at the rear and near the outer end of the unit.

As clearly shown, the end portions 2ᵇ of the intermediate connecting bar 2, lie flatwise along the transverse section of each bumper unit and are attached thereto by the bolts 8 and 9.

Thus it is possible to readily assemble a bumper to fit any make of vehicle by selecting the connecting bar of the required length, thereby avoiding the necessity of carrying in stock a large variety of bumpers made up in different lengths to meet the requirements of different makes of vehicles.

As shown in Figure 2, the assembled bumper is attached to the vehicle by means of fittings 11, which are secured to the ends of the frame members 12 and clamped to the rear portion of bar 4 of each bumper unit, adjacent its inner end.

Having set forth a preferred embodiment of my invention, I claim:

1. A bumper comprising impact sections, each consisting of a bar bent to form a closed loop having a straight transverse portion at its inner end and an intermediate bar provided with end portions bent at right angles thereto and connected in flatwise contact with the transverse and end portions of said impact sections.

2. In the bumper the combination of bumper sections spaced apart horizontally to provide for a spare wheel therebetween, an intermediate bar provided with arms extending transversely on opposite sides of said wheel, each section comprising a resilient bar bent to form a loop and fixed at each end adjacent the outer and inner ends respectively of the arms of said intermediate bar.

3. The combination with a vehicle having a spare tire mounted at the rear thereof, of a bumper having end sections mounted on the vehicle frame at opposite sides of said wheel, an intermediate bar extending between said sections and having portions bent at right angles to provide a space therebetween for said wheel, said end sections comprising resilient bars bent into loop forms with their ends bolted in flatwise contact with said arms.

4. A bumper comprising laterally spaced bumper units, each consisting of a bar shaped to form a closed loop having a straight transverse portion at its inner end, and an intermediate connecting bar provided with transverse end portions adapted for flatwise contact with said transverse portions of said units, and bolts passing through said contacting portions of said bar and bumper unit.

5. A bumper comprising laterally spaced impact units each consisting of resilient bars shaped to form a complete loop having their outer end portions spaced apart vertically to form an impact area of increased width, and their inner portions bent to form a straight transverse portion, and a single connecting bar having bent end portions adapted to extend throughout the transverse portions of said impact units, and bolts extending through said contacting portions.

WILLIAM J. GROTENHUIS.